US010216852B1

(12) United States Patent
Gupta et al.

(10) Patent No.: US 10,216,852 B1
(45) Date of Patent: Feb. 26, 2019

(54) INDEXING ACCESS LIMITED NATIVE APPLICATIONS

(71) Applicant: Google LLC, Mountain View, CA (US)

(72) Inventors: Pranay Gupta, San Francisco, CA (US); Chirag Shah, San Francisco, CA (US)

(73) Assignee: Google LLC, Mountain View, CA (US)

( * ) Notice: Subject to any disclaimer, the term of this patent is extended or adjusted under 35 U.S.C. 154(b) by 811 days.

(21) Appl. No.: 14/602,440

(22) Filed: Jan. 22, 2015

(51) Int. Cl.
G06F 17/30 (2006.01)

(52) U.S. Cl.
CPC .... *G06F 17/3087* (2013.01); *G06F 17/30619* (2013.01)

(58) Field of Classification Search
CPC .............. G06F 17/3087; G06F 17/30619
USPC ............................................... 707/711
See application file for complete search history.

(56) References Cited

U.S. PATENT DOCUMENTS

| 9,088,564 | B1* | 7/2015 | Hobson | H04L 63/083 |
| 9,436,763 | B1* | 9/2016 | Gianos | G06F 17/30864 |
| 9,571,282 | B1* | 2/2017 | Aggarwal | H04L 9/32 |
| 2007/0016583 | A1* | 1/2007 | Lempel | G06F 21/6218 |
| 2012/0016861 | A1 | 1/2012 | Edwards | |
| 2012/0124028 | A1* | 5/2012 | Tullis | G06F 8/60 707/711 |
| 2012/0317198 | A1* | 12/2012 | Patton | G06Q 10/10 709/204 |
| 2013/0124309 | A1* | 5/2013 | Traasdahl | H04L 67/22 705/14.49 |
| 2013/0290344 | A1* | 10/2013 | Glover | G06F 17/3053 707/741 |
| 2014/0250098 | A1 | 9/2014 | Kasterstein | |
| 2014/0250106 | A1 | 9/2014 | Shapira | |
| 2014/0365462 | A1* | 12/2014 | Chang | G06F 17/30864 707/711 |
| 2015/0113271 | A1* | 4/2015 | Jooste | H04L 63/08 713/168 |

* cited by examiner

*Primary Examiner* — James Trujillo
*Assistant Examiner* — Aida Z Tessema
(74) *Attorney, Agent, or Firm* — Fish & Richardson P.C.

(57) ABSTRACT

Methods, systems, and apparatus for determining that a native application limits access to the native application using account credential requirements, the native application generating an application environment for display on a user device within the native application and operating independent of a browser application that can operate on the user device; obtaining a set of account credentials for indexing environment instances of the native application; instantiating the native application with the set of account credentials; and accessing environment instances of the native application, and for each of the environment instances: generating environment instance data describing content of the environment instance, the content described by the environment instance data including text that a user device displays on the environment instance when the user device displays the environment instance; and indexing the environment instance data for the native application in an index that is searchable by a search engine.

18 Claims, 3 Drawing Sheets

INDEXING ACCESS LIMITED NATIVE APPLICATIONS

BACKGROUND

The Internet provides access to a wide variety of information. For example, digital image files, video and/or audio files, as well as web page resources for particular subjects or particular news articles, are accessible over the Internet. A variety of search engines are available for identifying particular resources accessible over the Internet. These search engines crawl and index the various web page resources. The search engine then uses the index to determine which resources are most responsive to a search query and provides search results that link to the resources in response to the query.

With the advent of tablet computers and smart phones, native applications that facilitate the performance of the same functions facilitated by the use of web page resources are now being provided in large numbers. Some of these native applications limit access to generic content in the native application until account credentials are provided to the native applications. Generic content may be content that is not specific to particular users.

SUMMARY

This specification describes technologies relating to indexing environment instances of native applications.

In general, one innovative aspect of the subject matter described in this specification can be embodied in methods that include the actions of determining that a native application limits access to the native application using account credential requirements, the native application generating an application environment for display on a user device within the native application and operating independent of a browser application that can operate on the user device. Additional actions include in response to determining that the native application limits access to the native application using account credential requirements, obtaining a set of account credentials for indexing environment instances of the native application. Further actions include instantiating the native application with the set of account credentials and accessing environment instances of the native application. Additional actions include, for each of the environment instances, generating environment instance data describing content of the environment instance, the content described by the environment instance data including text that a user device displays on the environment instance when the user device displays the environment instance, and indexing the environment instance data for the native application in an index that is searchable by a search engine.

Other embodiments of this aspect include corresponding systems, apparatus, and computer programs, configured to perform the actions of the methods, encoded on computer storage devices.

These and other versions may each optionally include one or more of the following features. For instance, in some implementations determining that a native application limits access to the native application using account credential requirements includes determining that the native application uses an account authentication service that uses the account credential requirements. In certain aspects, obtaining a set of account credentials for indexing environment instances generated by the native application includes obtaining a name and a password of an account for indexing environment instances generated by the native application.

In some aspects, the account is specific to an environment instance indexing process for indexing the environment instances generated by the native application and is not specific to one or more particular human users.

In some implementations, obtaining a set of account credentials for indexing environment instances generated by the native application includes determining that an account for indexing environment instances generated by the native application does not exist and generating the account for indexing environment instances generated by the native application, the account including the set of credentials. In certain aspects, generating the account for indexing environment instances generated by the native application includes generating (i) a name, (ii) a password, and (iii) other account information corresponding with account information expected for particular users providing search queries. In some aspects, obtaining a set of account credentials for indexing environment instances generated by the native application includes determining that an account for indexing environment instances generated by the native application does exist and identifying the set of account credentials for the account.

In some implementations, instantiating the native application with the set of account credentials includes instantiating a virtual machine emulating an operating system of the user device with the set of account credentials and instantiating the native application within the virtual machine. In certain aspects, instantiating a virtual machine emulating an operating system of a user device with the set of account credentials includes instantiating the virtual machine emulating the operating system of the user device where the operating system indicates that the account is signed in using the set of account credentials. In some aspects, accessing environment instances of the native application includes determining that the native application limits access to the native application using account credential requirements, in response to determining that the native application limits access to the native application using account credential requirements, identifying the set of account credentials that the native application is instantiated with, and accessing the environment instances of the native application using the set of account credentials.

Particular embodiments of the subject matter described in this specification can be implemented so as to realize one or more of the following advantages. Enabling an application indexer to access generic content in environment instances of native applications for which access is limited using account credential requirements allows for these environment instances to be indexed. This, in turn, may provide a search engine with the ability to provide search results that include the environment instances with generic content for which access is limited using account credential requirements. This may enable the search engine to provide more relevant search results in cases that the environment instances with generic content for which access is limited using account credential requirements are relevant to a search query.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1A:
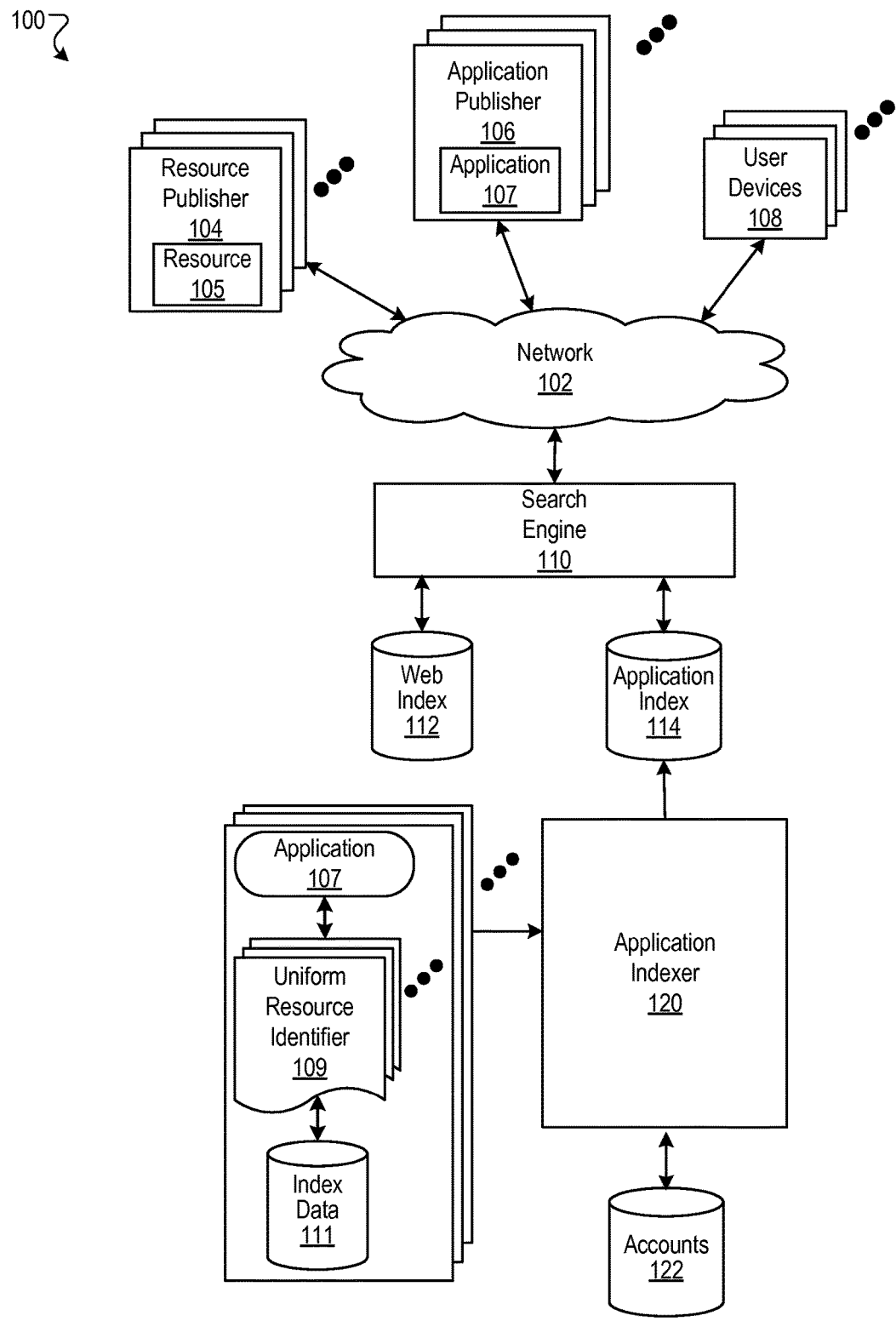
FIG. 1A is a block diagram of an example environment in which environment instances for native applications are indexed and searched.
Figure 1B:
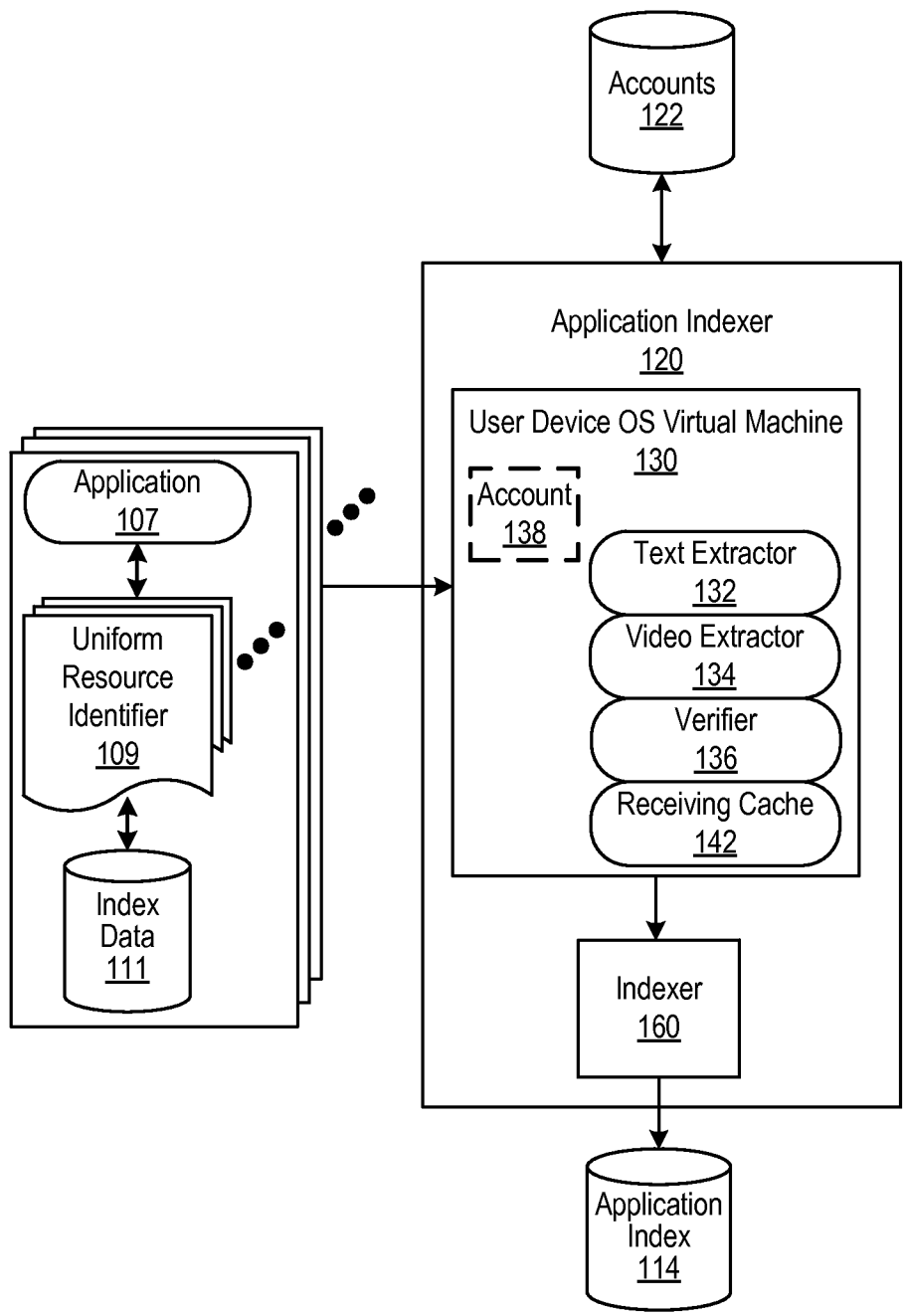
FIG. 1B is a block diagram of an example implementation of a native application indexer.

A system indexes environment instances of native applications. As used herein, a native application generates environment instances for display on a user device within an environment of the native application, and operates independent of a browser application on the user device. A native application is an application specifically designed to run on a particular user device operating system and machine firmware and not within a browser. Native applications thus differ from browser and browser-based applications and browser-rendered resources. The latter require all, or at least some, elements or instructions downloaded from a web server each time they are instantiated or rendered. Furthermore, browser-based applications and browser-rendered resources can be processed by all web-capable mobile devices within the browser and thus are not operating system specific as are native applications.

An environment instance of a native application is an instance of particular user experience environment within a native application, and the environment instances are each characterized by unique set of user interface features distinguishable from each other in the native application. For example, environment instances can be particular modes in an application, such as options screens, or three-dimensional sequences, such as a "tour" of a three dimensional space or an action sequence, such as a downhill skiing event, and the like. In the case of the latter, the user experience may be time based and require multiple frames, such as a three-dimensional experience in a game during which a user attempts to complete a task.

To index data for a native application, the system determines a set of environment instances of the native application. For example, the system may access environment instances that are specified by a publisher of the native application or automatically explore, e.g., crawl, various menus and selection options available in environment instances generated by the native application. For each of these environment instances, the system may generate environment instance data that describes features of the environment instance. For example, the system may extract visibly or non-visibly displayed text of an environment instance and generate environment instance data representing the extracted text. The system then indexes the native application environment instance data for the native application in an index that is searchable by a search engine. The search engine, in turn, can access the indexed data to determine environment instances of native applications that may be responsive to queries.

However, some native applications may limit access to the native applications using account credential requirements which may limit access by the system to the environment instances of the native application. For example, a native application may require that an account be logged in before environment instances beyond that of an initial log-in screen may be accessed. In another example, a native application may provide access to a subset of environment instances when account credentials are not provided but may limit access to a non-overlapping subset of environment instances until account credentials are provided. Accordingly, in the case where a native application limits access to generic content in the native application using account credential requirements, the system may obtain a set of robot account credentials for an account to index environment instances of the particular native application, e.g., from an account database 122, and then access the particular native application using the set of account credentials. Robot account credentials may be account credentials that are for an automated crawler and not a human.

Operation of the system that indexes environment instance data and the processing of search results for environment instances is described in more detail below.

FIG. 1A is a block diagram of an example environment 100 in which environment instances for native applications are indexed and searched. A computer network 102, such as the Internet, connects resource publisher websites 104, application publishers 106, user devices 108 and a search engine 110.

A resource publisher website 104 includes one or more web resources 105 associated with a domain and hosted by one or more servers in one or more locations. Generally, a resource publisher website is a collection of web pages formatted in hypertext markup language (HTML) that can contain text, images, multimedia content, and programming elements. Each resource publisher website 104 is maintained by a content publisher, which is an entity that controls, manages and/or owns the website 104.

A web page resource is any data that can be provided by a publisher website 104 over the network 102 and that has a resource address, e.g., a uniform resource locator (URL). Web resources may be HTML pages, images files, video files, audio files, and feed sources, to name just a few. The resources may include embedded information, e.g., meta information and hyperlinks, and/or embedded instructions, e.g., client-side scripts.

An application publisher website 106 may also include one or more web resources 105, and also provides native applications 107. As described above, a native application 107 is an application specifically designed to run on a particular user device operating system and machine firmware. As described above, a native application may have multiple environment instances, each specific to the particular native application. An environment instance differs from a rendered web resource in that the environment instance occurs within and is specific to the native application, while a web resource may be rendered in any browser for which the web page resource is compatible, and is independent of the operating system of the user device.

A user device 108 is an electronic device, and is capable of requesting and receiving web page resources 104 and native applications 107 over the network 102. Example user devices 108 include personal computers, mobile communication devices, and tablet computers.

To search web resources 105 and the native applications 107, the search engine 110 accesses a web index 112 and an application index 114. The web index 112 is an index of web resources 105 that has, for example, been built from crawling the publisher websites 104. The application index 114 is an index of environment instances for native applications 107, and is constructed using an application indexer 120 that implements an indexing process that is described in more detail below. Although shown as separate indexes, the web index 112 and the application index 114 can be combined in a single index.

The user devices 108 submit search queries to the search engine 110. In response to each query, the search engine 110 accesses the web index 112 and the application index 114 to identify resources and applications, respectively, that are relevant to the query. The search engine 110 may, for example, identify the resources and applications in the form of web resource search results and native application search results, respectively. Once generated, the search results are provided to the user device 108 from which the query was received.

A web resource search result is data generated by the search engine 110 that identifies a web resource and provides information that satisfies a particular search query. A web resource search result for a resource can include a web page title, a snippet of text extracted from the resource, and a resource locator for the resource, e.g., the URL of a web page.

A native application search result specifies a native application and is generated in response to a search of the application index 114 of environment instances. A variety of functions can be invoked by the selection of an application search result. For example, selection of a native application search result may cause the native application to launch (if installed on the user device 108) and generate the environment instance of the native application referenced in the native application search result.

Figure 2:
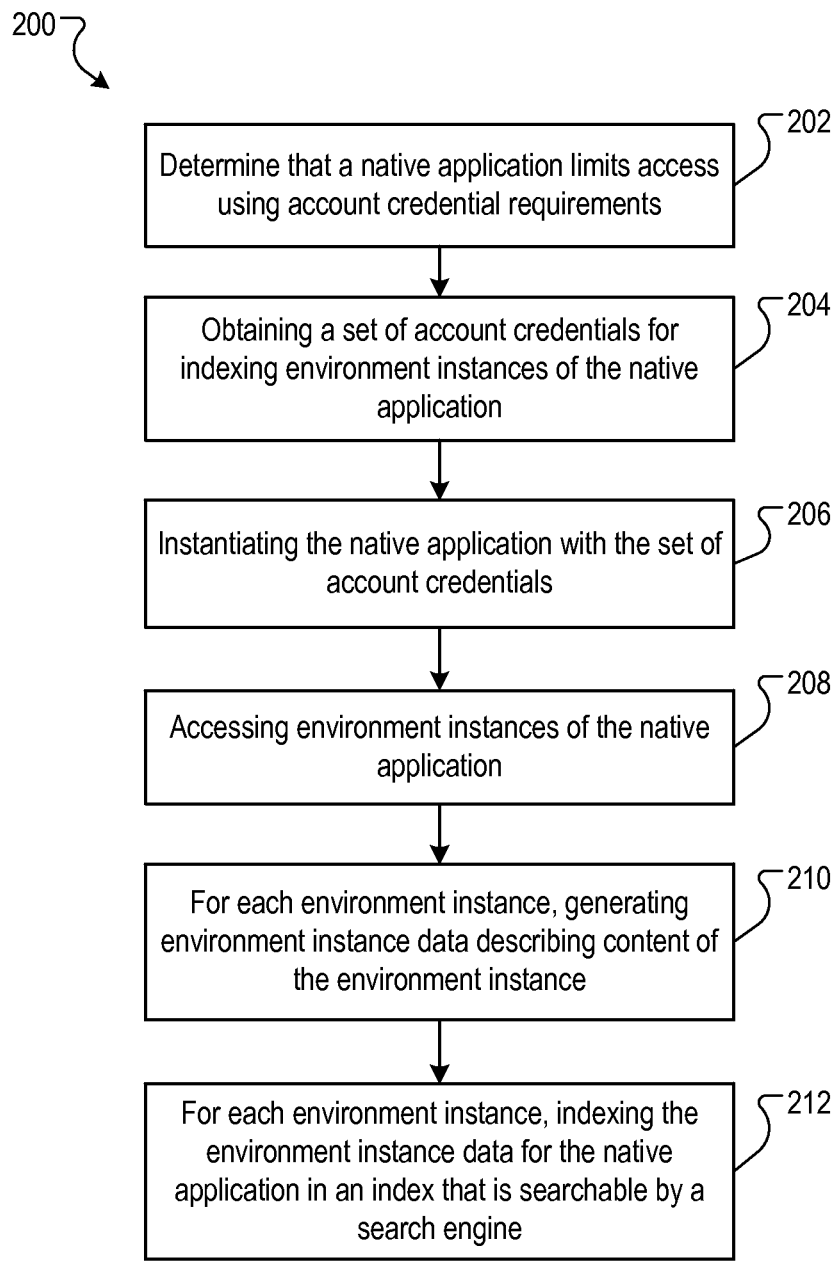
FIG. 2 is a flow diagram of an example process for indexing environment instances of native applications.

The collection of environment instance index data and indexing of the data for the application index 114 is described with reference to FIG. 2, which illustrates a flow diagram of an example process 200 for indexing environment instances of native applications. The process 200 can be implemented in a data processing apparatus of one or more computers in data communication with each other.

The process 200 determines that a native application 107 limits access to generic content in the native application 107 using account credential requirements (202). The process 200 may determine that a native application 107 limits access to generic content in the native application 107 in a variety of ways. In some implementations, the application indexer 120 may determine that a particular native application 107 limits access using account credential requirements based on identifying the particular native application 107 as a native application that has used an account authentication service. For example, the application indexer 120 may determine that a particular native application 107 has used an account authentication service by analyzing account authentication service usage logs. In another implementation, the application indexer 120 may determine that access to a native application is limited and then determine that the content for which access is limited is generic content.

In some implementations, the application indexer 120 may determine that a particular native application 107 limits access using account credential requirements based on identifying the particular native application 107 as a native application that has been indicated by an application publisher 106 as using the account authentication service. For example, the application indexer 120 may query a database that indicates native applications for which the application publisher 106 has indicated the native application 107 as using the account authentication service.

In some implementations, the application indexer 120 may analyze an environment instance generated by a particular native application 107 to determine if the particular native application 107 limits access to the native application 107. For example, the application indexer 120 may determine that an environment instance generated by a particular native application 107 when account credentials are not provided for particular native application 107 includes one or more input elements, e.g., a textbox for receiving a user name and a textbox for receiving a password, for account credentials.

The process 200 obtains a set of robot account credentials for indexing environment instances of the native application 107 (204). In some implementations, the set of robot account credentials may include a user name and a password of an account for indexing environment instances generated by a native application. For example, the set of account credentials for indexing native application "APP1" may include a user name "indexer_APP1_user" and a password "indexer_APP1_pass" of an account. In some implementations, the account for indexing environment instances generated by a particular native application may be specific to that particular native application. For example, the application indexer 120 may use a first account when accessing a first native application and use a different, second account when accessing a second native application. In some implementations, any account for indexing the environment instances generated by a native application may not be specific to one or more particular human users. For example, every account used by the application indexer 120 for indexing environment instances may be generated specifically for use by the application indexer 120 and not by humans.

In some implementations, the application indexer 120 may obtain the set of robot account credentials by determining whether an account for indexing environment instances generated by the native application exists. For example, the application indexer 120 may access an account database 122 that stores data indicating both account credentials for indexing environment instances and native applications that correspond to the account credentials and determine whether account credentials for a particular native application are stored in the account database 122.

If the application indexer 120 determines that the account database 122 does not store data indicating account credentials for a particular native application 107, the application indexer 120 may determine that a robot account for indexing environment instances generated by the native application 107 does not exist. In response to this determination, the application indexer 120 may trigger generating of an account for indexing environment instances generated by the native application 107. The application indexer 120 may generate a name and a password for an account for indexing environment instances generated by the native application 107. For example, the application indexer 120 may generate an account for indexing native application "APP1" with the set of account credentials of a user name "indexer_APP1_user" and a password "indexer_APP1_pass."

If the application indexer 120 determines that the account database 122 does store data for the particular native application 107, the application indexer 120 may determine that a robot account for indexing environment instances generated by the native application 107 does exist. In response to this determination, the application indexer 120 may obtain from the account database 122 the set of account credentials that corresponds to the native application 107. For example, the application indexer 120 may obtain from the account database 122 the set of account credentials of a user name "indexer_APP1_user" and a password "indexer_APP1_pass" for an account for indexing native application "APP1."

The process 200 instantiates the native application 107 with the set of robot account credentials (206). In some implementations, the application indexer 120 may instantiate the native application 107 with the set of robot account credentials by instantiating a virtual machine emulating an operating system of the user device with the set of account credentials and then instantiating the native application 107 within the virtual machine. The virtual machine 130 may, in some implementations, be a modified version of the operating system and includes extractors that extract data from environment instances as described in more detail below. The virtual machine 130 may, for each application in a set of native applications 107 to be processed, indicate that the operating system is signed in with an account 138 for indexing the native application 107 and launch an instance of the native application 107. In an alternate implementation, the application indexer 120 may instantiate the native application 107 with the set of robot account credentials by instantiating a virtual machine emulating an operating system of the user device with the set of account credentials already running the native application 107. In other implementations, the application indexer 120 may instantiate the native application 107 with the set of robot account credentials without instantiating a virtual machine emulating an operating system of the user device.

The application indexer 120 may instantiate a virtual machine emulating an operating system of a user device with the set of robot account credentials by having the operating system indicate that the account corresponding to the set of account credentials is signed in using the account credentials. For example, to index environment instances of native application "APP1," the application indexer 120 may instantiate an operating system of the user device where the operating system indicates that an account is signed in on the user device using the user name "index_APP1_user" and the password "index_APP1_pass," and then launch an instance of native application "APP1." In another example, the application indexer 120 may utilize a virtual machine emulating an operating system of a user device that has been instantiated with a set of credentials for indexing a particular native application and change the set of credentials to another set of credentials for indexing another native application.

When the native application 107 is launched by the application indexer 120, the native application 107 may determine that the emulated operating system indicates that an account is already signed in. For example, once the native application 107 is launched, the native application 107 may determine that an account is signed in on the user device using the user name "index_APP1_user" and the password "index_APP1_pass." The native application 107 may then verify that the set of account credentials are valid. For example, the native application 107 may utilize an account authentication service to determine whether the user name "index_APP1_user" and the password "index_APP1_pass" correspond to a valid account. If the native application 107 verifies that the set of account credentials are valid, the native application 107 may then enable the application indexer 120 to access environment instances of the native application 107 to which access is limited using account credentials.

The process 200 accesses environment instances of the native application 107 (208). In some implementations, the application indexer 120 instantiates the environment instances by an automated process that explores various menus and selection options available in each environment instance, and each subsequent environment instance. Such an automated process can be accomplished by sequentially selecting menu options and links according to a deterministic routine that results in the selection of each environment instance provided by the native application 107.

Alternatively, the virtual machine 130 can access the environment instances that are specified by a publisher of the native application. For example, as described above, the application publisher may provide a list of uniform resource identifiers 109 that the publisher desires to be crawled and indexed in the application index 114, and only those environment instances referenced by the URIs for the particular native application 107 are accessed and indexed.

The application indexer 120 may then generate environment instance data describing content of the environment instance (210). In some implementations, the virtual machine 130 includes extractors that extract textual data for indexing. The extracted textual data is, for example, data that has been embedded by the publisher for particular environment instances and is provided to a rendering process of the native application. The rendering process renders content based on the data for display on a user device. Use of extractors allows for more accurate identification of the textual data of an application instance, or alternative can be used to verify textual data that is provided separately with the uniform resource identifiers. For example, the text extractor 132 extracts text data provided to a rendering process of the native application. The text data specifies the text that is to be rendered in the environment instance in invisible form.

Other extractors can likewise be used, such as a video extractor 134. The video extractor 134 provides image data of an image or video (e.g., from a three dimensional experience) that is to be rendered in the environment of the native application 107. Other data can also be extracted, such as environment link data describing links within the environment instance that link to another environment instance in the application; web page link data describing links within the environment that link to a web resource referenced by a uniform resource locator and that, when selected, instantiate a browser application that renders the resource in a browser environment separate from the native application; etc.

To generate videos that may be used in search results, the virtual machine 130 can perform either a set of predefined actions or, alternatively, perform actions according to a predefined set of commands. In the case of the former, the virtual machine 130 may be programmed to perform certain actions such as inputting directional navigations, such as left, right, up and down; actuating direction navigation inputs, such as rotate left and rotate right, etc. In the case of the latter, the virtual machine 130 may perform actions stored in the index data 111, such as actions specified by a publisher. The actions may be specified in the form of a script, which causes a sequence of time-based inputs to be received by the program so as to generate a natural "tour" of a multi-dimensional environment; or, in the case of applications that implement artificial intelligence (e.g., "Bots"), a "bot mode" can be initiated and a video of the multi-dimensional environment as seen from the point of view of the bot can be recorded. Other appropriate ways of gathering video data to be recorded can also be used.

The extractors 132 and 134, and other appropriate data extractors, can be implemented using appropriate data handlers for a particular operating system. For example, for the Android™ operating system, the extractors 132 and 134 may be implemented using TextView objects and ImageView objects. The environment instance that corresponds to the uniform resource identifier (URI) is generated using a first OpenGL surface view of the environment instance. The textual data that is associated with the environment instance is provided to a rendering process of the native application in the form of a text view object and is overlaid on the OpenGL surface view. Because the text is designated as being invisible, the user does not see the text. The text data is also extracted from the text view object. The virtual machine 130 processes the objects to extract the corresponding data, e.g., by including instructions that cause the virtual machine to store for indexing the corresponding data that is provided for rendering.

The process 200 indexes the application environment instance data for the native application in an index that is searchable by a search engine (212). The data are indexed such that the search engine 110 may evaluate the relevance of environment instances to search queries. For example, the application indexer 120 may generate the application index 114 by indexing the application environment instance data. In a particular example, For example, an indexer 160 indexes, for each URI and native application 107 identifier, the native application environment instance data describing the content for the environment instance. Additional information, such as images, screenshot and even short videos of the native application environment instance can also be generated and indexed as well. These additional data are used in generating native application search results The indexed data are stored in the application index 114. A variety of appropriate indexing processes can be used to index the data. For example, the application index 114 can include, for each native application 107 and URI pair, a row of data describing the environment instance data. The particular database and indexing scheme used may, for example, depend on the search engine algorithms utilized within the search engine.

In some situations, a particular application instance may have different URIs that correspond to different content. For example, an automobile simulation application may have a first portion of a URI that is the same for an environment instances in which automobiles are rendered, and a second portion of the URI, such as a query parameter, that includes a name-value pair for a specific automobile to be rendered. In some implementations, each specific instance of a unique URI constitutes an entry in the application index 114.

Some native applications may request data and/or instructions from a source that is external to the virtual machine 130. Examples of such sources are web servers, feed sources, updated images for rendering, etc. The requested data and/or instructions may also be indexed in the application index 114. Accordingly, in some implementations, the virtual machine 130 may include a receiving cache 142 that stores data and instructions that are requested by the native application 107. The virtual machine 130 is configured to intercept the received data and store a copy of the data in the receiving cache 142 for indexing.

After the application index 114 is built, the search engine 110 can access the application index 114 to identify native applications that may be responsive to a query. In some implementations, the applications may be identified by native application search results.

In some implementations, the process 200 may enable the application indexer 120 to index native applications that limit access using account credential requirements without requiring that the native applications be specifically modified to enable the application indexer 120 to index the native applications. For example, once the application indexer 120 instantiates a virtual machine using the set of account credentials and launches the native application 107, the native application 107 may perform its usual function of determining if the operating system indicates that an account that may be used to access the native application 107 is signed in.

In some implementations, the native application 107 may generate generic content for environment instances based on information of an account used to access the native application 107. For example, if account information indicates an account is for a user in England, the native application 107 may generate environment instances with generic content targeted for users in England. Similarly, if account information indicates an account is for a user in Spain, the native application 107 may generate environment instances with generic content targeted for users in Spain.

So that the search engine 110 may provide potentially more relevant search results to search queries from particular users, the application indexer 120 may obtain a set of robot account credentials for an account that includes information corresponding with information expected for the particular users providing search queries. For example, when the application indexer 120 is generating environment instance data for responding to search queries from users in England, the application indexer 120 may obtain a set of robot account credentials for an account that includes information indicating that the account is for a robot user configured to provide results for England. In another example, when the application indexer 120 is generating environment instance data for responding to search queries from users in Spain, the application indexer 120 may obtain a set of robot account credentials for an account that includes information indicating that the account is for a robot user configured to provide results for Spain.

The application indexer 120 may then generate the environment instance data using the different robot accounts and index the environment instance data based on the account information. For example, the application indexer 120 may index that a set of environment instance data corresponds to users in England and another set of environment instance data corresponds to users in Spain. When the search engine 110 receives a search query, the search engine 110 may consider information regarding the user, e.g., account information for the user or location of the user device 108, and bias towards providing results from sets of environment instance data that were indexed by the application indexer 120 when accessing a native application with an account with information that corresponds to the user providing the search query. For example, the system 100 may define a taxonomy of types of users that may provide search queries, and in response to receiving a search query from a particular user, the search engine 110 may classify the particular user according to the taxonomy and weight search results towards results that correspond to environment instance data that was indexed by the application indexer 120 with an account with information that matches the user type classified for the particular user providing the search query. Accordingly, the search engine 110 may weight search results for a user in the United States towards results that correspond with environment instance data that was indexed by the application indexer 120 when accessing native applications using robot accounts with information configured to provide results to user types for the United States and weight search results for a user in England towards results that correspond with environment instance data that was indexed by the application indexer 120 when accessing native applications using robot accounts with information configured to provide results to user types for England.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The environment computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a user computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include users and servers. A user and server are generally remote from each other and typically interact through a communication network. The relationship of user and server arises by virtue of computer programs running on the respective computers and having a user-server relationship to each other. In some embodiments, a server transmits data (e.g., an HTML page) to a user device (e.g., for purposes of displaying data to and receiving user input from a user interacting with the user device). Data generated at the user device (e.g., a result of the user interaction) can be received from the user device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method performed by data processing apparatus comprising one or more computers in data communication, the method comprising:
    determining that a native application limits access to the native application using account credential requirements, the native application generating an application environment for display on a user device within the native application and operating independent of a browser application that can operate on the user device;
    in response to determining that the native application limits access to the native application using account credential requirements, obtaining, for an automated crawler, a set of account credentials for indexing environment instances of the native application, wherein the account credentials are robot account credentials for the automated crawler that is not a human user and is not specific to a human user, and the robot account credentials are generated specifically for the automated crawler and specific to the native application and different from robot account credentials for other native applications;
    instantiating the native application with the set of account credentials; and
    accessing environment instances of the native application, and for each of the environment instances:
        generating environment instance data describing content of the environment instance, the content described by the environment instance data including text that a user device displays on the environment instance when the user device displays the environment instance, wherein the content described by the environment instance data in the native application instantiated using the robot account credentials is content that is not specific to any particular human user; and
        indexing the environment instance data for the native application in an index that is searchable by a search engine.

2. The method of claim 1, wherein determining that a native application limits access to the native application using account credential requirements comprises:
    determining that the native application uses an account authentication service that uses the account credential requirements.

3. The method of claim 1, wherein obtaining a set of account credentials for indexing environment instances generated by the native application comprises:
    obtaining a name and a password of an account for indexing environment instances generated by the native application.

4. The method of claim 1, wherein obtaining a set of account credentials for indexing environment instances generated by the native application comprises:
    determining that an account for indexing environment instances generated by the native application does not exist; and
    generating the account for indexing environment instances generated by the native application, the account including the set of credentials.

5. The method of claim 4, wherein generating the account for indexing environment instances generated by the native application comprises:
    generating (i) a name, (ii) a password, and (iii) other account information corresponding with account information expected for particular users providing search queries.

6. The method of claim 1, wherein obtaining a set of account credentials for indexing environment instances generated by the native application comprises:
    determining that an account for indexing environment instances generated by the native application does exist; and
    identifying the set of account credentials for the account.

7. The method of claim 1, wherein instantiating the native application with the set of account credentials comprises:
    instantiating a virtual machine emulating an operating system of the user device with the set of account credentials; and
    instantiating the native application within the virtual machine.

8. The method of claim 7, wherein instantiating a virtual machine emulating an operating system of a user device with the set of account credentials comprises:
    instantiating the virtual machine emulating the operating system of the user device where the operating system indicates that the account is signed in using the set of account credentials.

9. The method of claim 1, wherein accessing environment instances of the native application comprises:

determining that the native application limits access to the native application using account credential requirements;

in response to determining that the native application limits access to the native application using account credential requirements, identifying the set of account credentials that the native application is instantiated with; and accessing the environment instances of the native application using the set of account credentials.

10. A system, comprising:

a data processing apparatus; and software stored in non-transitory computer readable storage medium storing instructions executable by the data processing apparatus and that upon such execution cause the data processing apparatus to perform operations comprising:

determining that a native application limits access to the native application using account credential requirements, the native application generating an application environment for display on a user device within the native application and operating independent of a browser application that can operate on the user device;

in response to determining that the native application limits access to the native application using account credential requirements, obtaining, for an automated crawler, a set of account credentials for indexing environment instances of the native application, wherein the account credentials are robot account credentials for the automated crawler that is not a human user and is not specific to a human user, and the robot account credentials are generated specifically for the automated crawler and specific to the native application and different from robot account credentials for other native applications;

instantiating the native application with the set of account credentials; and accessing environment instances of the native application, and for each of the environment instances:

generating environment instance data describing content of the environment instance, the content described by the environment instance data including text that a user device displays on the environment instance when the user device displays the environment instance, wherein the content described by the environment instance data in the native application instantiated using the robot account credentials is content that is not specific to any particular human user; and indexing the environment instance data for the native application in an index that is searchable by a search engine.

11. The system of claim 10, wherein determining that a native application limits access to the native application using account credential requirements comprises:

determining that the native application uses an account authentication service that uses the account credential requirements.

12. The system of claim 10, wherein obtaining a set of account credentials for indexing environment instances generated by the native application comprises:

obtaining a name and a password of an account for indexing environment instances generated by the native application.

13. The system of claim 10, wherein obtaining a set of account credentials for indexing environment instances generated by the native application comprises:

determining that an account for indexing environment instances generated by the native application does not exist; and generating the account for indexing environment instances generated by the native application, the account including the set of credentials.

14. The system of claim 13, wherein generating the account for indexing environment instances generated by the native application comprises:

generating (i) a name, (ii) a password, and (iii) other account information corresponding with account information expected for particular users providing search queries.

15. The system of claim 10, wherein obtaining a set of account credentials for indexing environment instances generated by the native application comprises:

determining that an account for indexing environment instances generated by the native application does exist; and identifying the set of account credentials for the account.

16. The system of claim 10, wherein instantiating the native application with the set of account credentials comprises:

instantiating a virtual machine emulating an operating system of the user device with the set of account credentials; and instantiating the native application within the virtual machine.

17. The system of claim 16, wherein instantiating a virtual machine emulating an operating system of a user device with the set of account credentials comprises:

instantiating the virtual machine emulating the operating system of the user device where the operating system indicates that the account is signed in using the set of account credentials.

18. A non-transitory computer readable memory storage system storing instructions executable by a data processing apparatus and that upon such execution cause the data processing apparatus to perform operations comprising:

determining that a native application limits access to the native application using account credential requirements, the native application generating an application environment for display on a user device within the native application and operating independent of a browser application that can operate on the user device;

in response to determining that the native application limits access to the native application using account credential requirements, obtaining, for an automated crawler, a set of account credentials for indexing environment instances of the native application, wherein the account credentials are robot account credentials for the automated crawler that is not a human user and is not specific to a human user, and the robot account credentials are generated specifically for the automated crawler and specific to the native application and different from robot account credentials for other native applications;

instantiating the native application with the set of account credentials; and accessing environment instances of the native application, and for each of the environment instances:

generating environment instance data describing content of the environment instance, the content described by the environment instance data including text that a user device displays on the environment instance when the user device displays the environment instance, wherein the content described by the environment instance data in the native application instantiated using the robot account credentials is content that is not specific to any particular human user; and indexing the environment instance data for the native application in an index that is searchable by a search engine.

\* \* \* \* \*

UNITED STATES PATENT AND TRADEMARK OFFICE
CERTIFICATE OF CORRECTION

PATENT NO. : 10,216,852 B1
APPLICATION NO. : 14/602440
DATED : February 26, 2019
INVENTOR(S) : Gupta et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 915 days.

Signed and Sealed this
Twenty-fourth Day of September, 2019

Andrei Iancu
*Director of the United States Patent and Trademark Office*